United States Patent [19]

Heise

[11] Patent Number: 4,655,703
[45] Date of Patent: Apr. 7, 1987

[54] EMBOSSING CALENDER FOR THERMOPLASTICS MATERIAL FILMS

[75] Inventor: Wolfgang Heise, Hanover, Fed. Rep. of Germany

[73] Assignee: Hermann Berstorff Maschinenbau GmbH, Hanover, Fed. Rep. of Germany

[21] Appl. No.: 824,643

[22] Filed: Jan. 31, 1986

[30] Foreign Application Priority Data

Feb. 22, 1985 [DE] Fed. Rep. of Germany ....... 3506256

[51] Int. Cl.⁴ ............................................. B29C 43/24
[52] U.S. Cl. .................................... 425/335; 425/367; 425/394
[58] Field of Search ............... 425/335, 363, 367, 383, 425/384, 385, 394

[56] References Cited

U.S. PATENT DOCUMENTS 4,214,857  7/1980  Woeckener et al. ................ 425/335
4,559,990  12/1985  Greilinger et al. ................ 425/367

FOREIGN PATENT DOCUMENTS 1436891  9/1971  Fed. Rep. of Germany .

Primary Examiner—Willard E. Hoag
Attorney, Agent, or Firm—Schwartz, Jeffery, Schwaab, Mack, Blumenthal & Evans

[57] ABSTRACT

An embossing calender arrangement for thermoplastics material films which can be used for embossing either the top side or the underside of a film as desired comprises an embossing calender, the rollers of which are rotatably mounted in a frame. The frame, together with the calender is displaceable to and from a pivoting position by being suitably mounted and, when in such pivoting position, is pivotable.

5 Claims, 3 Drawing Figures

EMBOSSING CALENDER FOR THERMOPLASTICS MATERIAL FILMS

FIELD OF THE INVENTION

The present invention relates to an embossing calender for thermoplastics material films. More particularly, the invention relates to an embossing calender of the type which comprises an embossing roller, a counter-roller provided with a resilient external surface and an auxiliary roller, all of the rollers being mounted in a frame member.

BACKGROUND OF THE INVENTION AND PRIOR ART DISCUSSION

An embossing calender for thermoplastics material films generally of the above-described type is disclosed in German Auslegeschrift No. 1 436 891. In such calender, the film is embossed on one side by being passed through a roller gap between an embossing roller having a desired pattern on its external surface, and a counter-roller or auxiliary roller which has a resilient external surface. The film to be embossed is unwound from a roll or spool, embossed and then re-wound.

A film of thermoplastics material, such as polyvinyl chloride, is produced by a calender and is then drawn-out in a drawing device in a ratio of approximately two to one.

After the drawing process, the film passes into an embossing device which comprises an embossing roller, a resilient counter-roller and a drive roller. The counter-roller is provided with a resilient external surface of coating and is pressed against the drive roller by the embossing roller. This causes all of the rollers to be rotated simultaneously.

During the course of the embossing process, it is particularly important to ensure that the film is aligned at right angles to the longitudinal axis of the gap between the counter-roller and the embossing roller when it enters the gap. However, the film must not come into contact with either the embossing roller or the counter-roller before the embossing is effected.

If an extensive range of films are being produced on a single calendering system, it is highly desirable to be able to emboss, alternately, the underside or the top side of the film in dependence, of course, upon the type of film to be embossed.

Hitherto, when it was desired to change the side of a specific type of film to be embossed, complete dismantling of the embossing calender was necessary. This was mainly because the film had to be conducted either vertically or horizontally into the embossing gap without, however, having any prior contact with the rollers. Such a change-over procedure could well take an entire working day with the consequential loss of production.

OBJECTS OF THE INVENTION

The present invention seeks to provide an embossing calender which permits either the underside or the top side of a thermoplastics film to be embossed as desired with the change-over being achieved in a very simple manner. In consequence, the present invention seeks to provide such an embossing calender in which the change-over time can be reduced to a minimum.

SUMMARY OF THE INVENTION

According to the present invention, there is provided an embossing calender for thermoplastics material films, comprising an embossing roller, a counter-roller provided with a resilient external surface, and a pressure or auxiliary roller, the rollers being mounted in a frame member wherein the frame is displaceable into and out of a pivotal position and is mounted so as to be pivotal at said pivotal position. Due to the fact that the frame is adapted to be displaceable into a pivotal position at which it is pivoted through, for example, 90°, the embossing calender can be adapted to emboss either side of a thermoplastic material film, as desired, in a very simple and rapid manner.

In such a case, it is of prime importance that when a changeover has been effected, the embossing gap is still disposed in such a manner that the film can be directly conducted into the gap without previously contacting either the embossing roller or the counter-roller.

The frame, which accommodates all three rollers, effects a short displacement movement and is prevented from pivoting until such displacement has taken place. In practice, such displacement is in a horizontal direction and causes the embossing roller, which is normally disposed below a drawing device, to be moved away from the drawing device. The frame can then be pivoted from, preferably, a horizontal position into a vertical position and does not strike the drawing device. The pivotal movement, when the frame is located in the pivoting position, makes it possible for the film to pass centrally into the new embossing gap and to be embossed on its other side.

The displacement movement of the frame may be effected, for example, by means of hydraulic piston and cylinder arrangements which engage with the frame or by means of spindle drives.

Advantageously toothed wheels or wheel segments are mounted on the pivot axis for the frame, driven pinions being provided which are engageable with the toothed wheels or wheel segments, in the pivotal position of the frame to cause the pivotal movement of the frame.

The pinions may be driven by a three-phase motor or they may be mounted on output shafts of at least one hydraulic rotary cylinder so as to be driven thereby.

By driving the pinions, the teeth of which engage in the toothed wheel or wheel segments of the frame, the frame is raised at the end remote from that at which the toothed wheel or wheel segments are provided and is pivoted into its new position.

BRIEF DESCRIPTION OF THE DRAWINGS

Two preferred embodiments of an embossing calender in accordance with the present invention will be further described, by way of example, with reference to the accompanying drawings, in which.

DESCRIPTION OF PREFERRED EMBODIMENTS

Figure 1:
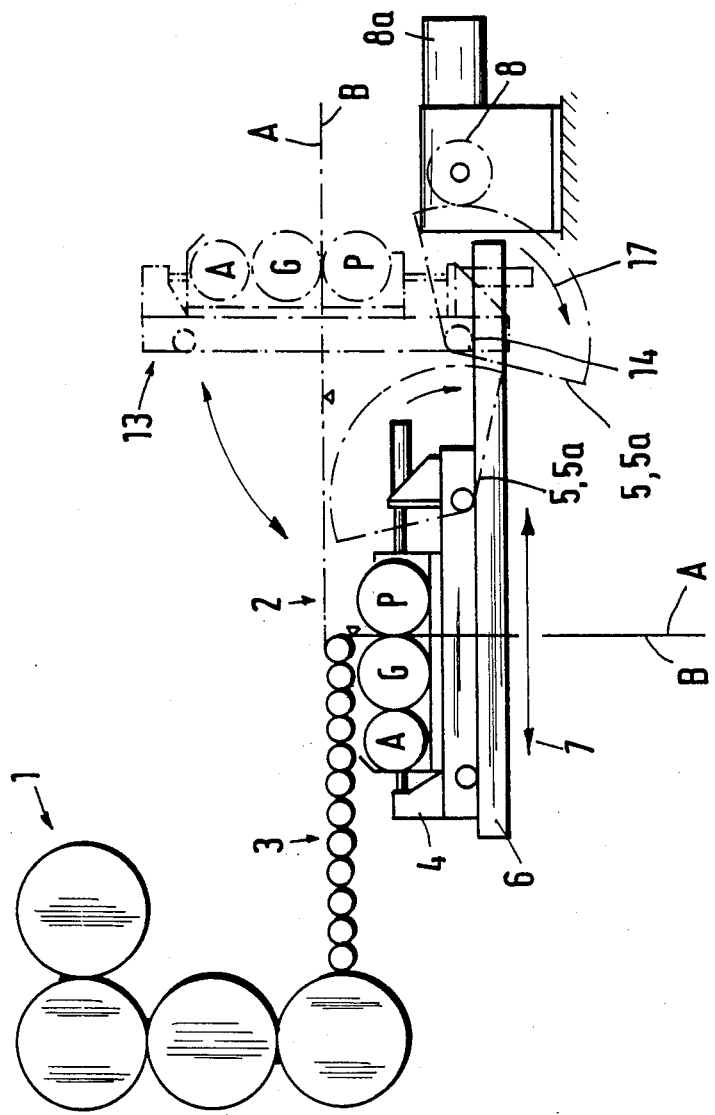
FIG. 1 is a schematic side view of a first embodiment of an embossing calender system in accordance with the present invention which includes means for pivoting the embossing calender.

In FIG. 1, there is shown an embossing calender system in accordance with the present invention and which comprises a calender generally referenced 1 for producing a film of polyvinyl chloride or a similar thermoplastics material. The system also comprises an embossing calender generally referenced 2 for embossing one side of the film produced by the calender 1. A drawing device 3 is disposed between the calender 1 and the embossing calender 2. The embossing calender comprises a frame 4 in which an embossing roller P, a counter-roller G and a drive roller A are mounted.

Toothed segments or wheels 5 are non-rotatably mounted on each side of the frame 4 in the lower region thereof. The embossing calender 2 is horizontally displaceable on rails 6 in the directions of the double-headed arrow 7 by suitable means, such as hydraulic piston and cylinder arrangements or spindle drives. (Not shown).

A film which is produced by the calender 1 and which is drawn in the drawing device 3 then passes into the gap between the embossing roller P and the counter-roller G to be embossed on one side. The embossed side of the film is denoted by A in FIG. 1 and will hereinafter be referred to as the underside whilst the non-embossed side is denoted by B and will hereinafter be referred to as the top side.

If it is now desired to emboss the top side B instead of the underside A, the embossing calender 2 is moved, in one of the directions of the arrow 7, towards pinions 8. This is effected by means of the hydraulic piston and cylinder arrangements mentioned hereinbefore. When the non-rotatable toothed segments or wheels 5 have engaged with the pinions 8, the embossing calender 2 is locked in position by suitable means, not shown.

Subsequently, the pinions 8 are set in rotational movement by a drive unit 8a. This causes the toothed wheel segments 5a to be lowered in the direction of arrow 17 which, in turn, simultaneously causes the pivoting of the frame 4 and the rollers mounted therein into the position shown in broken lines at 13.

By actuating the drive unit 8a, therefore, the end of the frame 4 remote from the toothed wheel or segments 5 is slowly raised until the frame has been pivoted into the position 13 for embossing the top side.

Film issuing from the drawing device 3 is then introduced into the gap between the embossing roller P and the counter-roller G, and the top side B of the film is embossed instead of the underside A. Such a changeover takes only a few minutes instead of an entire working day which was the case in prior art arrangements.

Figure 2:
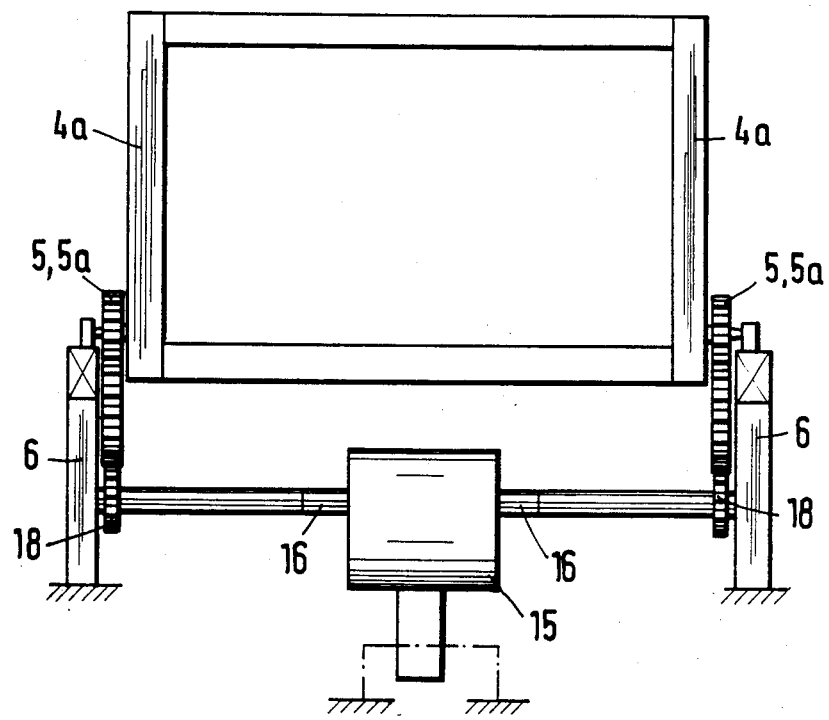
FIG. 2 shows a front elevational view of part of the system shown in FIG. 1 but with alternative means for effecting the pivotal movement.
Figure 3:
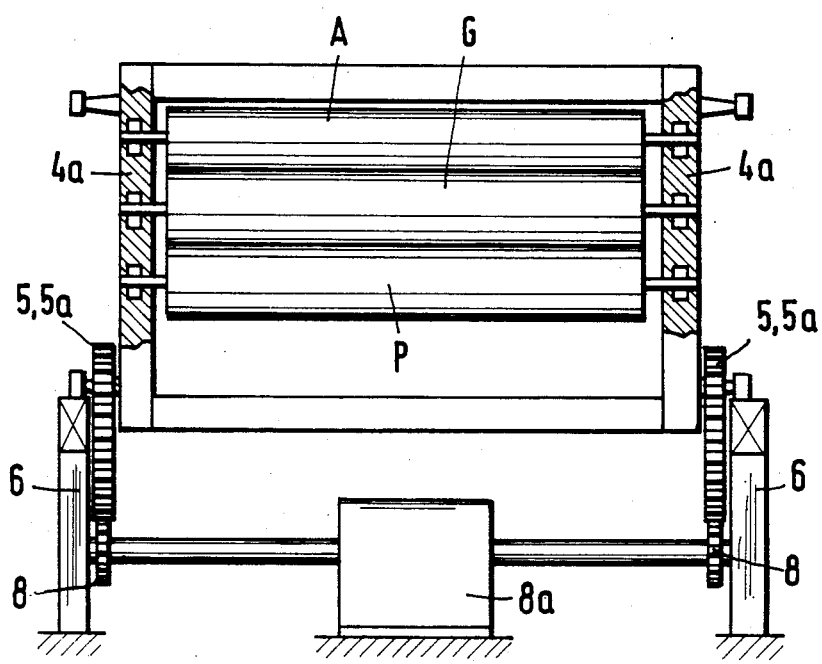
FIG. 3 is a front elevational view similar to FIG. 2 but showing the embossing calender in an upwardly pivoted position instead of a horizontal position.

In an alternative embodiment, shown in FIG. 2, the pivotal movement of the frame into the vertical position 13 is effected slightly differently. In this arrangement, a hydraulic rotary cylinder 15 is provided which has output shafts 16 disposed at each of its ends. Pinions 18 are secured to each of the output shafts 16. These pinions 18 engage in the toothed wheel or segments 5 and 5a and pivot the frame 4 into its vertical position 13, in the same manner as described with reference to FIG. 1.

I claim:

1. An embossing calender for thermoplastics material films comprising frame means and embossing means mounted in said frame means, said embossing means comprising embossing roller means, counter-roller means and auxiliary roller means, said frame including mounting means permitting rotation of each said roller means, said counter-roller means including a resilient external surface, means mounting said frame means to permit displacement of said frame means and said embossing means mounted therein to and from a pivoting station and pivot mounting means for said frame means to permit pivotal movement of said frame means and said embossing means mounted therein at said pivoting station.

2. An embossing calender as recited in claim 1 wherein said means mounting said frame means permit said displacement in a horizontal direction and wherein said pivot mounting means permit pivotal movement of said frame means between a horizontal and a vertical orientation.

3. An embossing calender as recited in claim 1, wherein said pivot mounting means include a pivot axis means, said pivot axis means carrying toothed wheels or wheel segments and further including pinion means engageable with said toothed wheels or wheel segments to cause said pivotal movement of said frame at said pivoting station and drive means for said pinion means.

4. An embossing calender as recited in claim 3 wherein said drive means comprises a three phase motor.

5. An embossing calender as recited in claim 3 wherein said drive means comprises at least one hydraulic rotary cylinder, said cylinder including output shafts, said output shafts carrying said pinions.

* * * * *